United States Patent
Kito

(10) Patent No.: US 7,532,802 B2
(45) Date of Patent: May 12, 2009

(54) APPARATUS AND PROGRAM FOR IMAGE REPRODUCTION

(75) Inventor: Eiichi Kito, Kaisei-machi (JP)

(73) Assignee: FUJIFILM Corporation, Tokyo (JP)

( * ) Notice: Subject to any disclaimer, the term of this patent is extended or adjusted under 35 U.S.C. 154(b) by 1136 days.

(21) Appl. No.: 10/811,869

(22) Filed: Mar. 30, 2004

(65) Prior Publication Data

US 2004/0190873 A1    Sep. 30, 2004

(30) Foreign Application Priority Data

Mar. 31, 2003    (JP)    ............... 2003-094530

(51) Int. Cl.
*H04N 5/91*    (2006.01)
(52) U.S. Cl. .......................... 386/52; 386/55
(58) Field of Classification Search .................. 386/46, 386/52, 55, 65, 95, 112
See application file for complete search history.

(56) References Cited

U.S. PATENT DOCUMENTS 5,539,527 A * 7/1996 Kajimoto et al. .............. 386/52

2002/0032909 A1    3/2002    Kazuo et al.

FOREIGN PATENT DOCUMENTS

| JP | 62-186361 | | 8/1987 |
|---|---|---|---|
| JP | 6-121241 | A | 4/1994 |
| JP | 7-131868 | A | 5/1995 |
| JP | 11-203360 | A | 7/1999 |
| JP | 2001-054041 | | 2/2001 |
| JP | 2001-245248 | | 9/2001 |
| JP | 2001-326828 | A | 11/2001 |
| JP | 2002-152662 | | 5/2002 |

\* cited by examiner

*Primary Examiner*—Huy T Nguyen
(74) *Attorney, Agent, or Firm*—Sughrue Mion, PLLC

(57) ABSTRACT

Image data sets obtained by photography can be reproduced without consideration of image sources that store the image data sets. Image storage devices are connected to an image reproduction apparatus, and image data sets that have been recorded serially are read from one of the image storage devices. When a boundary of the image data sets read from the image storage device is detected, another one of the image storage devices that stores the image data sets to follow the image data sets is searched for. The image data sets stored in the image storage device that has been found are then read by switching the image storage devices and sequentially reproduced on a display device.

8 Claims, 5 Drawing Sheets

| IMAGE SOURCE | RECORDING PERIOD |
|---|---|
| DVD PLAYER | 1999/4/28~2002/1/20 |
| IMAGE STORAGE SERVER | 2002/1/2~2002/8/10 |
| DIGITAL STILL CAMERA | 2002/8/20~2002/10/30 |

(1)

(2)

(1)

(2)

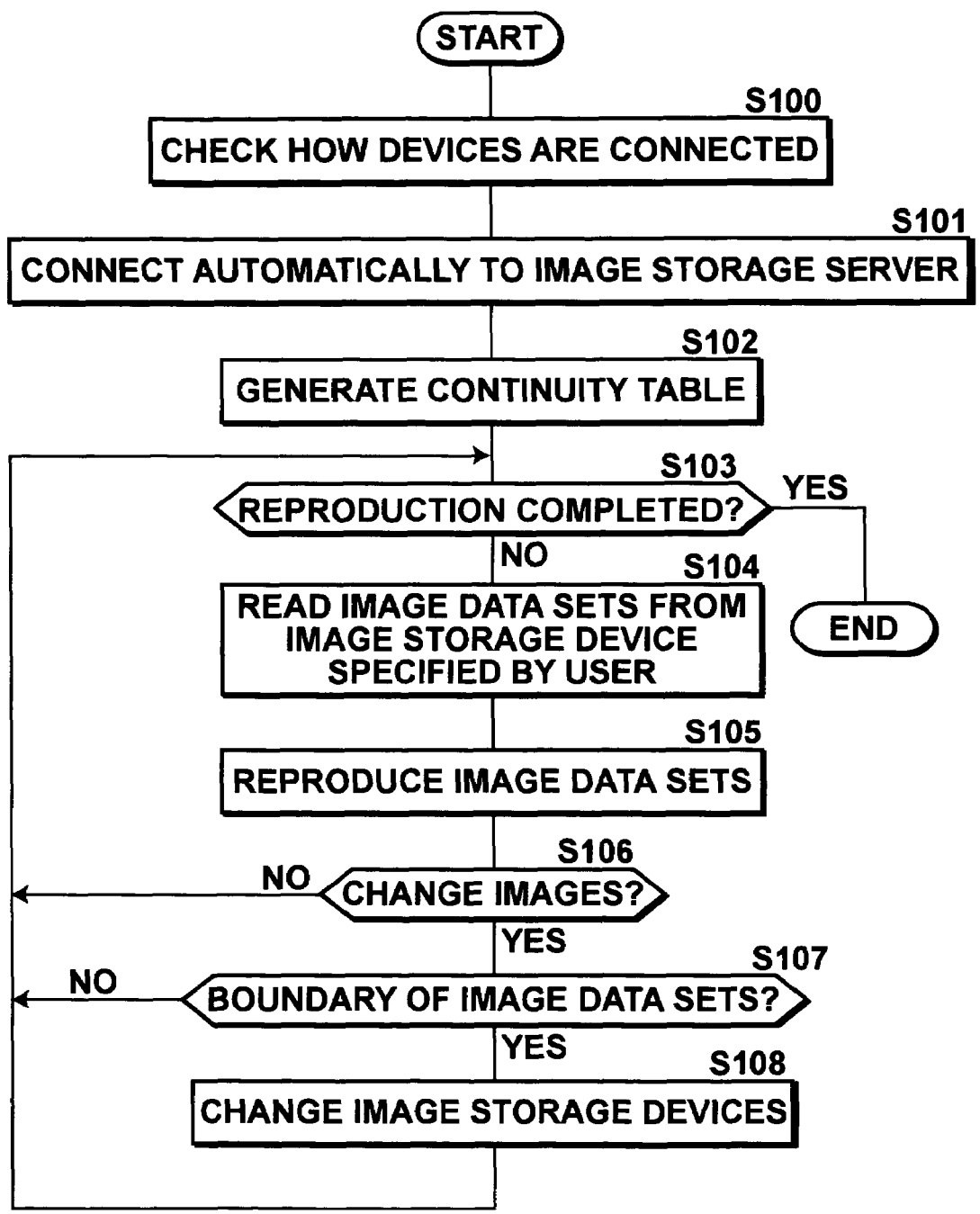

APPARATUS AND PROGRAM FOR IMAGE REPRODUCTION

BACKGROUND OF THE INVENTION

1. Field of the Invention

The present invention relates to an apparatus and a program for reproducing image data obtained by a digital still camera or the like.

2. Description of the Related Art

As one form of digital photograph services, an image storage service has been known. In an image storage service, image data are received from a customer and stored in a system of a service provider such as a DPE store and a laboratory, and a printing order is received via a network such as the Internet.

In such a service, image data received from a customer are stored in a system of a service provider and can be accessed by inputting a password or the like on a network. The customer can also browse the image data stored in the system and can place a printing order regarding the image data stored in the system by accessing the system via the network (see U.S. Patent Laid-Open No. 20020032909, for example).

In a system for providing such a service, image data are deleted after a predetermined period has expired, since an image storage server has limited capacity. Therefore, a system has also been proposed for automatically deleting image data whose storage period has expired without involving an operator or a system administrator while the storage period can be changed (see Japanese Unexamined Patent Publication No. 11 (1999)-203360, for example). Furthermore, a method has also been proposed for sending image data whose storage period in an image server has expired to a user by recording the image data in a recording medium such as a DVD.

Moreover, a reproduction apparatus has also been proposed for enabling reproduction of an image from a video cassette recorder and reproduction of an image received by a tuner by switching the input sources of the image to be displayed on a display device such as a television set (see Japanese Unexamined Patent Publications No. 6(1994)-121241, 7(1995)-131868, and 2001-326828, for example).

By using such an image storage service described above, a customer becomes free from a trouble of storing a large amount of images he/she photographed. However, when the customer wishes to find a desired one of the images, the customer does not know whether the image is stored in a DVD, or in an image server, or in a digital still camera, for example. Therefore, the customer needs to find the image from all the images stored in a personal computer, the DVD, the digital still camera, and the like, which is troublesome for the customer.

Some of TV sets and personal computers have a function of displaying an image that is input from a digital still camera and an image that is stored in a DVD by switching the input sources. However, in order to find a desired image, a user needs to change a device (the input source) storing images to be reproduced. Consequently, the user cannot find the desired image without thinking of the device.

SUMMARY OF THE INVENTION

The present invention has been conceived based on consideration of the above circumstances. An object of the present invention is therefore to provide an apparatus that can reproduce image data obtained by photography, without consideration of an image source that stores the image data.

An image reproduction apparatus of the present invention comprises:
a plurality of image storage devices;
an image display device; and
an image reproduction device coupled between the image storage devices and the image display device to sequentially reproduce serial image data sets obtained from the image storage devices on the image display device;
said image reproduction device comprising:
input means connected with said plurality of image storage devices for inputting serial image data sets from the image storage devices;
reading means for reading the serial image data sets from one of the image storage devices;
boundary detection means for finding a boundary of the serial image data sets read from the image storage device by the reading means;
storage device search means for searching the image storage devices for the image storage device that stores serial image data sets to be continued from the boundary of the serial image data sets found by the boundary detection means;
switching means for switching the image storage device read by the reading means to the image storage device searched for by the storage device search means when the boundary of the serial image data sets is detected by the boundary detection means; and
reproduction means for enabling sequential reproduction of the serial image data sets read by the reading means on said image display device.

A program of the present invention is a program that causes a computer to have functions of:
connection means for connecting a plurality of image storage devices;
reading means for reading serial image data sets from one of the image storage devices;
boundary detection means for finding a boundary of the serial image data sets read from the image storage device by the reading means;
storage device search means for searching the image storage devices for the image storage device that stores serial image data sets to be continued from the boundary of the serial image data sets found by the boundary detection means;
switching means for switching the image storage device read by the reading means to the image storage device searched for by the storage device search means when the boundary of the serial image data sets is detected by the boundary detection means; and
reproduction means for enabling sequential reproduction of the serial image data sets read by the reading means on a display device.

The image storage devices refer to devices that enable recording of various image data sets. More specifically, the image storage devices refer to an imaging device (such as a digital still camera), a DVD player, a memory-type recording medium (such as a SmartMedia® and a Memory Stick®), and a server such as a photo bank that stores images as an Internet service, for example. The connection means refers to a device driver and communication means corresponding to each of the image storage devices and is used for controlling the image storage devices in order to read the image data sets therefrom.

The serial image data sets refer to image data sets sequentially recorded in order of time and date of photography (hereinafter referred to as the photography date). The serial image data sets may lack some of the sequentially recorded image data sets. Continuity and discontinuity of the image data sets can be distinguished by referring to information that accompanies the image data sets, such as file names or the photography date. For example, the serial image data sets refer to image data sets having serial file names such as "DSC001", "DSC002" and "DSC003" that correspond to frames of images photographed by a digital still camera or the like.

The boundary of the serial image data sets refers to where an identification index of the respective image data sets, which is serial in order of the photography date, becomes discontinuous. For example, if the respective image data sets are recorded sequentially with an identification index (such as file names thereof) including a serial number corresponding to the photography date, the boundary refers to where the continuity of the serial number in the identification index ends.

More specifically, the boundary refers to the end of the image data sets stored in one of the image storage devices. Furthermore, the accompanying information such as the file names or the photography date of the image data sets stored in one of the image storage devices can induce judgment of the boundary thereof. For example, in the case where the image data sets are recorded with file names including a serial number, the image data sets can be judged to have a boundary where the serial number becomes discontinuous.

The serial image data sets to be continued from the boundary of the serial image data sets found by the boundary detection means refer to image data sets starting from the image data set having the closest number to the boundary of the serial image data sets found by the detection means. For example, in the case where the serial image data sets have an identification index showing continuity in order of the photography date, the image data sets to be continued refer to the image data sets starting from the image data set having the identification index that is closest to the identification index at which the continuity ends.

For example, if one of the image storage devices stores image data sets having file names from "DSC020" to "DSC040", the file having the file name "DSC020" is the last image data set when the image data sets are sequentially traced back from DSC040. Therefore, the image data set having the file name "DSC020" is the boundary of the image data sets. In this case, the serial image data sets to be continued from the boundary of the serial image data sets found by the detection means starts from the image data set whose file name is "DSC019". Therefore, the storage device search means searches for the image storage device that stores the image data set having the file name "DSC019". In the case where the image data set "DSC019" has been deleted and does not exist in any one of the image storage devices, the image data sets to be continued from the image data set DSC020 at the boundary starts from the image data set whose file name is "DSC018". Therefore, the image data sets to be continued may start from the image data set closest to the boundary of the serial image data sets.

Sequential reproduction of the serial image data sets on a display device refers to reproduction of the serial image data sets on the display device in serial order. For example, the image data sets can be reproduced serially by using an increment or decrement key.

The image storage devices may include an image storage server for storing the image data sets by being connected to a network. In this case, the reading means can read the image data sets stored in the image storage server via the network.

In the case where the image data sets are read from the image storage server, it is preferable for user information to be sent to the image storage server for identifying a user of the image data sets stored in the image storage server. In this manner, only the image data sets corresponding to the user information can be read from the image storage server.

The reproduction means preferably reproduces the image data sets preceding the boundary and the image data sets following the boundary in the same screen of the display device.

The respective image storage devices may record the image data sets by associating the image data sets. In this case, the image storage devices record at least one of the associated image data sets as representative image data so that the reproduction means can reproduce the image data sets that are associated with each other when the representative image data thereof are specified.

Recording the image data sets by associating the image data sets refers to recording the image data sets by grouping the image data sets so that the fact that the image data sets belong to the same group can be recognized.

The representative image data refer to image data that can be used as an index of the image data sets to be managed by being associated. More specifically, when the image data sets that are relevant to each other are grouped (such as image data sets of a trip or a record of a child growth, and image data sets of similar scenes), the representative image data refer to at least one of the image data sets selected therefrom. By displaying only the representative image data, the content in the group can be understood without display of all the image data sets therein.

Reproducing the image data sets that are associated with each other when the representative image data are specified refers to enabling reproduction of all the image data sets included in the group that the representative image data belong to.

In some cases, the image data sets can be judged to be associated with each other based on the accompanying information thereof. In this case, the image reproduction apparatus may further comprise management means for collectively managing the image data sets that are associated with each other among the image data sets stored in the image storage devices so that the reproduction means can collectively reproduce the image data sets that are associated with each other.

Managing collectively refers to grouping the image data sets by associating the image data sets and adding information that represents the fact that the image data sets belong to the same group. Reproducing collectively refers to enabling reproduction of the image data sets that are managed collectively in each group.

More specifically, the image data sets that are judged to be relevant to each other from the photography date or a photography interval may be managed collectively.

The image data sets to be reproduced may be specified by an external reproduction image specification device such as a digital still camera or a remote control. In this case, the image reproduction apparatus further comprises reception means for receiving a control code for specifying the image data sets to be reproduced from the reproduction image specification device, and the reproduction means reproduces the image data sets according to the control code.

The image reproduction apparatus of the present invention is connected to the image storage devices, and the serial image data sets are read from one of the storage devices. When the end of the image data sets or discontinuity of the number added to the file names is detected, the image data sets following the serial image data sets are found from another one of the image storage devices and reproduced. In this manner, even in the case where the image data sets photographed by a digital still camera or the like are stored in the image storage devices, the image data sets can be confirmed in order of photography.

When the image data sets stored in the image storage server are read as in the case of a photo bank, the image data sets stored in a digital still camera or a DVD connected directly to the image reproduction apparatus can be read in the same manner as the image data sets stored in the image storage server. Therefore, the image data sets can be reproduced in such a manner that images represented by all the image data sets are serial.

If the user information for identifying the user of the image data sets is sent to the image storage server and the image data sets corresponding to the user information are read from the image storage server, only the image data sets of the user can be read from the image storage server that also stores image data sets of other users.

In the case where the image data sets that precede the boundary of the serial image data sets are reproduced in the same screen as the image data sets that follows the boundary, all the image data sets can be reproduced sequentially without consideration of the image storage devices.

If the image data sets associated with each other have the representative image data and if the image data sets can be reproduced by specifying the representative image data, the image data sets that are similar to each other or the image data sets belonging to the same event can be collectively dealt with, for example. Therefore, the image data sets can be searched for based on the representative image data alone, without confirmation of all the image data sets.

Alternatively, if collective management can be carried out for the image data sets that are associated with each other among the image data sets stored in the image storage devices, the image data sets that are similar to each other or relevant to the same event can be collectively dealt with, for example. Therefore, the image data sets can be searched for without confirmation of all the image data sets.

Furthermore, if the control code can be received from the digital still camera or the remote control for specifying the image data sets to be reproduced, the image data sets can be easily selected.

BRIEF DESCRIPTION OF THE DRAWINGS

FIG. 6 is a flow chart showing a procedure carried out in the image reproduction apparatus.

DESCRIPTION OF THE PREFERRED EMBODIMENT

Figure 1:
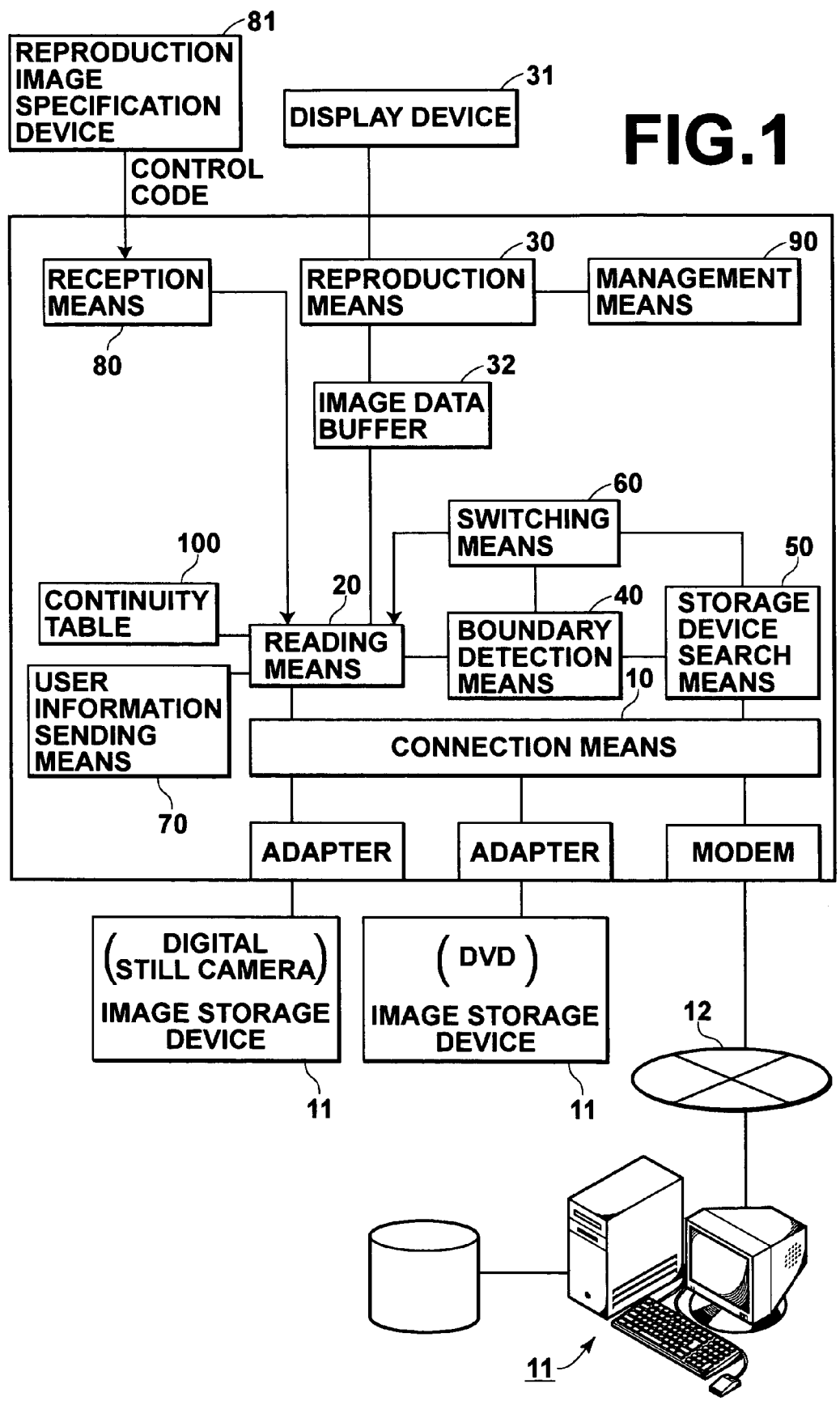
FIG. 1 is a diagram showing a configuration of an image reproduction apparatus.

Hereinafter, an embodiment of an image reproduction apparatus of the present invention will be explained with reference to the accompanying drawings. FIG. 1 is a diagram showing a configuration of the image reproduction apparatus of the present invention.

As shown in FIG. 1, an image reproduction apparatus 1 comprises connection means 10, reading means 20, reproduction means 30, boundary detection means 40, storage device search means 50, and switching means 60. The connection means 10 connects image storage devices 11 of various kinds. The image storage devices 11 store image data sets that are recorded serially. The reading means 20 reads the image data sets from the image storage devices 11. The reproduction means 30 sequentially reproduces the image data sets on a display device 31. The boundary detection means 40 detects a boundary of the image data sets recorded serially in the respective image storage devices 11. The storage device search means 50 searches for the image storage device 11 that stores the image data sets to be continued from the image data sets whose boundary has been detected by the boundary detection means 40. The switching means 60 switches the image storage device 11 from which the image data sets have been read to the image storage device 11 that has been searched for by the storage device search means 50 when the boundary is detected.

The image data sets in this embodiment are obtained by photography using an imaging device such as a digital still camera and a digital camcorder. The image storage devices 11 refer to an imaging device, a DVD player, a memory-type recording medium such as a Smart Media and a Memory Stick, and an image storage server such as a photo bank provided as an Internet service.

The image data sets obtained by photography with the imaging device are recorded serially therein in order of photography. When the image data sets amount to some degree, the image data sets are moved from the imaging device to the recording medium or sent to the image storage server to be stored therein. The image data sets stored in the image storage server are collectively sent to the user by being recorded in a portable recording medium such as a DVD after a predetermined period has expired or when a size of the image data sets becomes larger than a predetermined size. In this manner, the image data sets are moved by being grouped serially between the image storage devices 11 such as the digital still camera, the recording medium and the image storage server.

The image reproduction apparatus 1 may be a TV set connected to the DVD player and the digital still camera, for example. The image reproduction apparatus 1 may also be a personal computer connected to a DVD reading device, the digital still camera, and a reading device for a memory-type recording medium. In this case, the image reproduction apparatus 1 preferably has a function of accessing a network 12 such as the Internet so that the image data sets stored in the image storage server can be read.

Alternatively, the image reproduction apparatus 1 may be a printing order reception apparatus installed in a laboratory of a DPE store or the like. In this case, the printing order reception apparatus comprises a reading device for reading the image data sets stored in the DVD, the memory-type recording medium, and the digital still camera. In this manner, the printing order reception apparatus can read the image data sets not only from the DVD, the recording medium, and the digital still camera but also from the image storage server connected thereto.

Functions of the image reproduction apparatus 1 will be explained next in detail.

The connection means 10 has a function of establishing connection to the image storage devices 11 that are connected to the image reproduction apparatus 1. More specifically, the connection means refers to a device driver for controlling the digital still camera, the DVD reading device, the reading device for the memory-type recording medium, and a hard disc (including a hard disc installed in a personal computer). The connection means 10 also refers to a communication unit for sending and receiving the image data sets to and from the image storage server by accessing the network 12.

The reading means 20 has a function of reading the image data sets stored in the image storage devices 11 by using the device driver and the communication unit described above.

In the case where one of the image storage devices is the image storage server used in the service provided on the Internet, image data sets of other users are also stored therein. Therefore, the user needs to read his/her image data sets. For this reason, the image reproduction apparatus 1 may comprise user information sending means 70 for sending user information for identifying the user to the image storage server so that only the image data sets corresponding to the user information can be read through downloading from the image storage server with use of HTTP or FTP.

The image data sets stored in the image storage devices 11 are recorded serially, as has been described above. However, the image data sets are moved collectively in a group of some size. Therefore, although the image data sets are consecutive in the group, the image data sets belonging to the group are not continuous from the image data sets belonging to another group. For example, image data sets photographed by a digital still camera or the like are recorded with serial file names in order of photography. The larger the serial number is, the more recently the corresponding image data set was photographed. If the digital still camera as the imaging device stores the image data sets having file names from DSC020 to DSC040, the image data set whose file name is DSC020 is the last image data set when the image data sets are traced back from the image data set DSC040. Therefore, the boundary of the image data sets is the image data set DSC020. In some cases, if the image data sets were read to be moved temporarily to the recording medium or to be stored in the image storage server, the image data sets that were serial may not be serial. For example, if the image data sets DSC021 to DCS039 stored in the digital camera are moved to another one of the image storage devices, the image data sets still stored in the digital still camera becomes discontinuous such as DSC019, DSC020, DSC040, and DSC041. Therefore, the boundary of the image data sets is found where the serial number becomes discontinuous, that is, between the image data sets DSC020 and DSC040. In the case where the photography date is added as the accompanying information, the photography date can be used for judging continuity of the image data sets.

Therefore, the boundary detection means 40 detects the boundary between the serial image data sets by using the file names or the photography date as the accompanying information of the image data sets.

The storage device search means 50 searches for the image storage device 11 that stores the image data sets to be continued from the image data sets whose boundary has been detected. For example, if the image data sets stored in the digital still camera are DSC020 to DSC040, the image data set DSC020 is the boundary, and the storage device search means 50 searches for the image storage device 11 that stores the image data set DSC019 to be continued from the image data set DSC020. Alternatively, in the case where the image data sets stored in the digital still camera are not continuous like DSC019, DSC020, DSC040, and DSC041, the boundary is located between the image data sets DSC020 and DSC040. Therefore, the storage device search means 50 searches for the image storage device 11 that stores the image data set DSC039 that should come before the image data set DSC040. At this time, some of the serial image data sets may not exist due to deletion thereof, for example. Therefore, if the image data set DSC039 does not exist, the storage device search means 50 sequentially searches for the image data set having the closest number to the DSC039 (such as DSC038 and then DSC037 if DSC038 does not exist). In this manner, the storage device search means 50 finds the image. storage device 11 that stores the image data sets to be continued from the boundary of the image data sets.

Figures 2, 3:
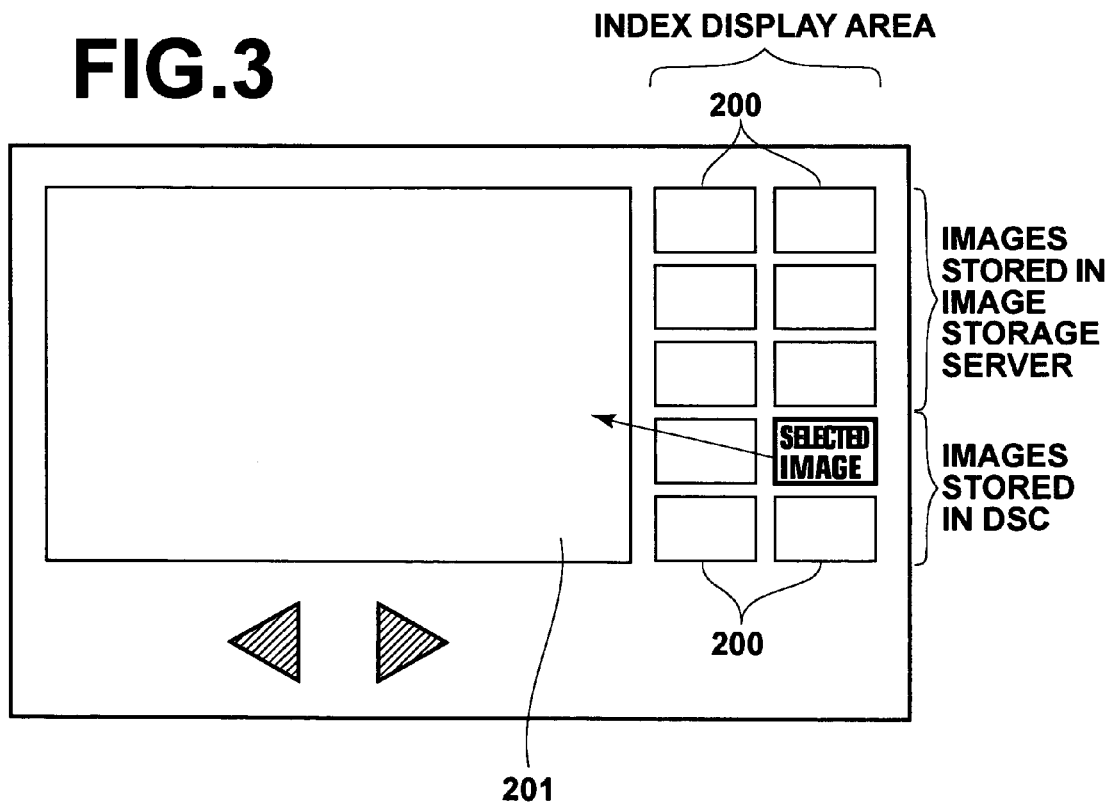
FIG. 2 shows how image data sets are stored serially in image storage devices.
FIG. 3 shows a screen in which the image data sets are displayed (part 1)

Alternatively, in the case where the serial image data sets stored in the image storage server are sent collectively to the user by being recorded in a portable recording medium such as a DVD in the image storage service, the image data sets are often stored first in the DVD, then in the image storage server, and in the digital still camera, as shown in FIG. 2. Therefore, how the image storage devices 11 are connected may be detected when the image reproduction apparatus 1 is started, for example. The order of reading the image data sets can thus be determined according to how the image storage devices 11 are connected, such as from the digital still camera, then from the image storage server, and from the DVD player.

For example, if connection of the digital still camera, the image storage server and the DVD player to the image reproduction apparatus 1 is detected, the image data sets are assumed to have been recorded in order of the digital still camera, the image storage server and the DVD. In the case where only the digital still camera and the DVD player are connected and the image storage server is not connected, the image data sets to be continued from the image data sets in the digital still camera are assumed to be stored in the DVD.

Therefore, the switching means 60 switches the image storage device to read the image data sets by using the reading means 20 to the image storage device found by the storage device search means 50 when the boundary is found by the boundary detection means 40. In this manner, the reading means 20 can sequentially read the serial image data sets recorded in the respective image storage devices 11.

The reproduction means 30 sequentially reproduces the image data sets read from the image storage devices 11 by the reading means 20. For example, as shown in FIG. 3, if a plurality of thumbnail images 200 are displayed in the right of a screen (in an index display area) and an image 201 specified for enlargement is displayed at the center of the screen, the reading means 20 reads the image data sets that immediately precedes and follows the image data set representing the enlarged image on the screen and stores the image data sets in an image data buffer 32 (hereinafter simply referred to as the buffer 32). If increment or decrement is instructed from a button of a TV set or a keyboard of a personal computer regarding the enlarged image to be displayed, the corresponding one of the image data sets stored in the buffer 32 is displayed at the center of the screen, and the thumbnail images are also displayed by being scrolled.

In order to display in the above manner, the image data sets that precedes or follows the enlarged image data set need to be read by the reading means 20 and stored in the buffer 32. Therefore, in response to the instruction of increment or decrement, the image data sets immediately preceding and following the image data set are read from the corresponding image storage device 11. At this time, if the boundary detection means 40 finds the boundary of the image data sets (that is, either the last image data set in one group or discontinuity in the image data sets), the switching means 60 changes the image storage device 11 to be read by the reading means 20 to the image storage device that has been searched for by the storage device search means 50. Therefore, the image data sets are serially stored in the buffer 32 by being read from the respective image storage devices 11, and can be displayed sequentially on the screen. (In FIG. 3, the image data sets in the image storage server and the digital still camera are displayed in the index display area.)

For example, in the case where the image data sets are recorded in order of the DVD, the image storage server, and the digital still camera as shown in FIG. 2, when serial display of the image data sets is instructed, the image data sets are sequentially reproduced from the image data set recorded most recently in the digital still camera. When the last image data set read from the digital still camera is reproduced, the image data sets are read from the image storage server and reproduced. When the last image data set read from the image storage server is reproduced, the image data sets are read from the DVD and reproduced serially.

The image data set to be reproduced may be instructed from a reproduction image specification device 81 such as a remote control of the TV set or the digital still camera. In this case, the image reproduction apparatus 1 further comprises reception means 80 for receiving a control code from the reproduction image specification device 81. For example, when an increment key or a decrement key is pressed on the digital still camera or the remote control of the TV set, the control code corresponding to the key is received by the reception means 80. The image data set corresponding to the instruction is then reproduced on the display device. The reception means 80 converts the control code into a common internal control code that is not dependent on the type of the reproduction image specification device 81. Therefore, even when the boundary is found and the image storage devices 11 are switched from one to another, the reproduction image specification device 81 can be used continuously.

Figure 4:
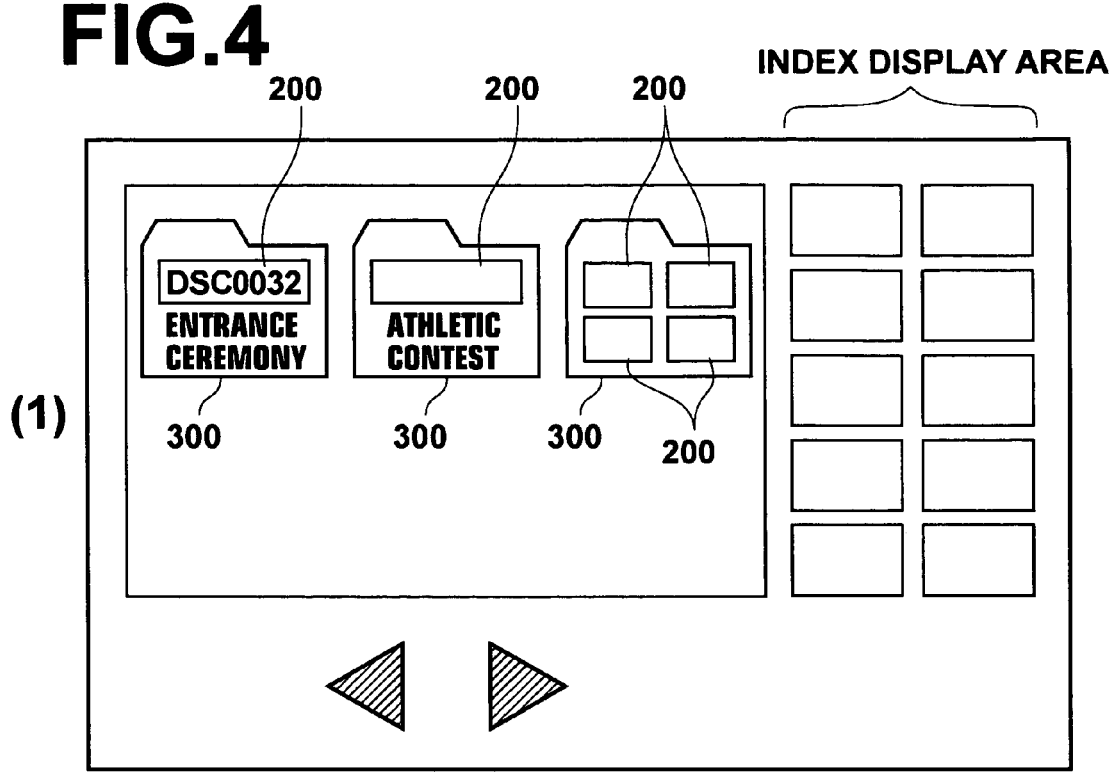
FIGS. 4(1) and 4(2) show the screen in which the image data sets are displayed (part 2)
Figure 4:
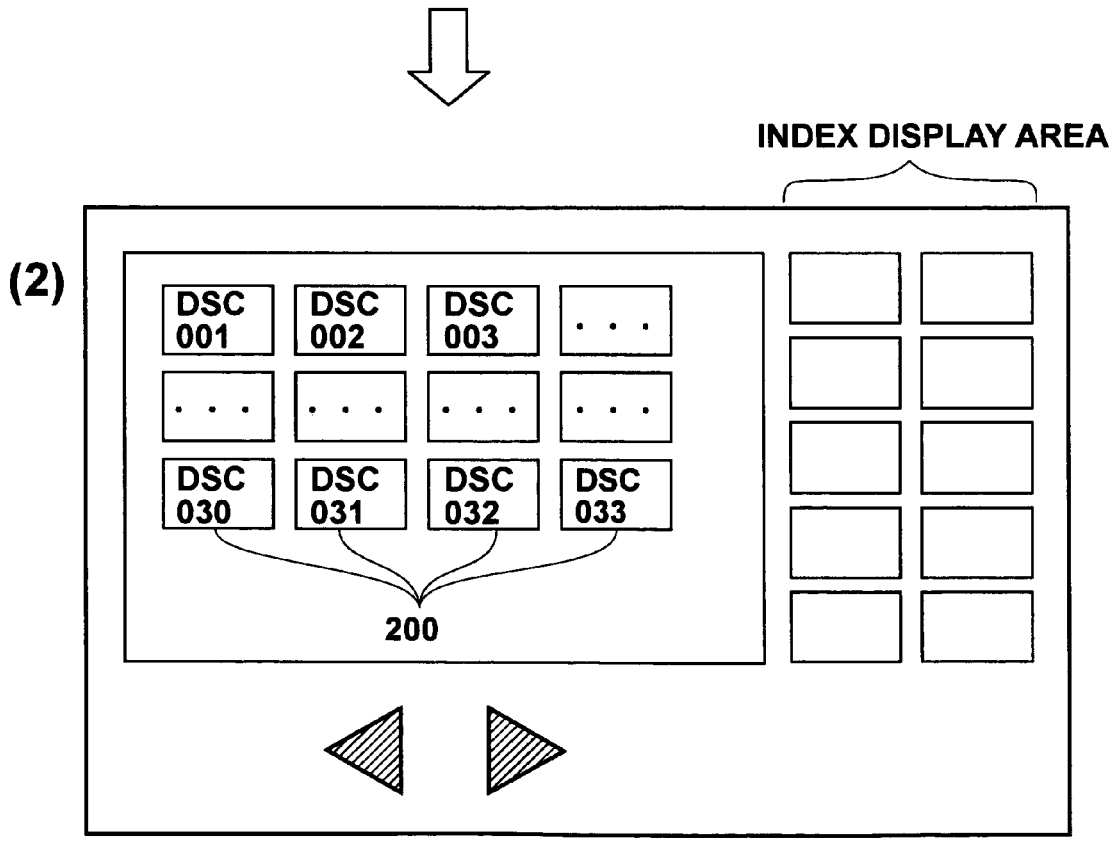

In the case where the image data sets are stored by being grouped according to relevance thereof (such as image data sets having similar scenes) and one or more of the image data sets therein are specified as a representative or representatives of the image data sets (hereinafter referred to as the representative image data set or sets), the thumbnail images 200 of the representative image data sets are displayed on the screen as shown in FIG. 4(1). When one of the representative image data sets is selected, the thumbnail images 200 of the relevant image data sets may be displayed on the screen as shown in FIG. 4(2). In the example shown in FIG. 4, the similar image data sets DSC001, DSC002, DSC003, . . . , DSC032, and DSC033 are grouped and the image data set DSC032 is used as the representative image data set. When a folder 300 displaying the thumbnail image of DSC032 is selected, the image data sets DSC001, DSC002, DSC003, . . . , DSC032, and DSC033 are displayed on the screen. Instead of the thumbnail images 200, character strings representing the content of the relevant images or the file names of the representative image data sets maybe displayed. In FIG. 4(2), the thumbnail images 200 are displayed at the center of the screen, which may be displayed in the index display area.

In this manner, the image data sets that are relevant to the same event or similar to each other can be collectively dealt with. Furthermore, the image data sets can be searched for by display of the representative image data sets without display of all the image data sets.

Figure 5:
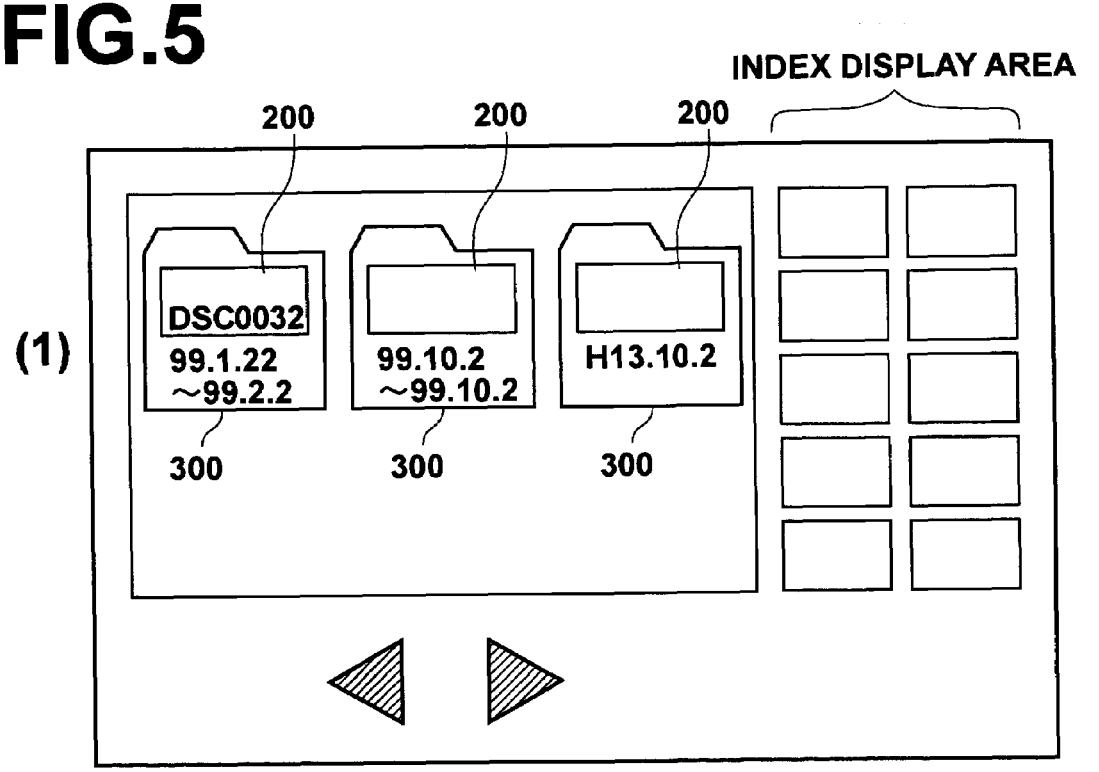
FIGS. 5(1) and 5(2) show the screen in which the image data sets are displayed (part 3)
Figure 5:
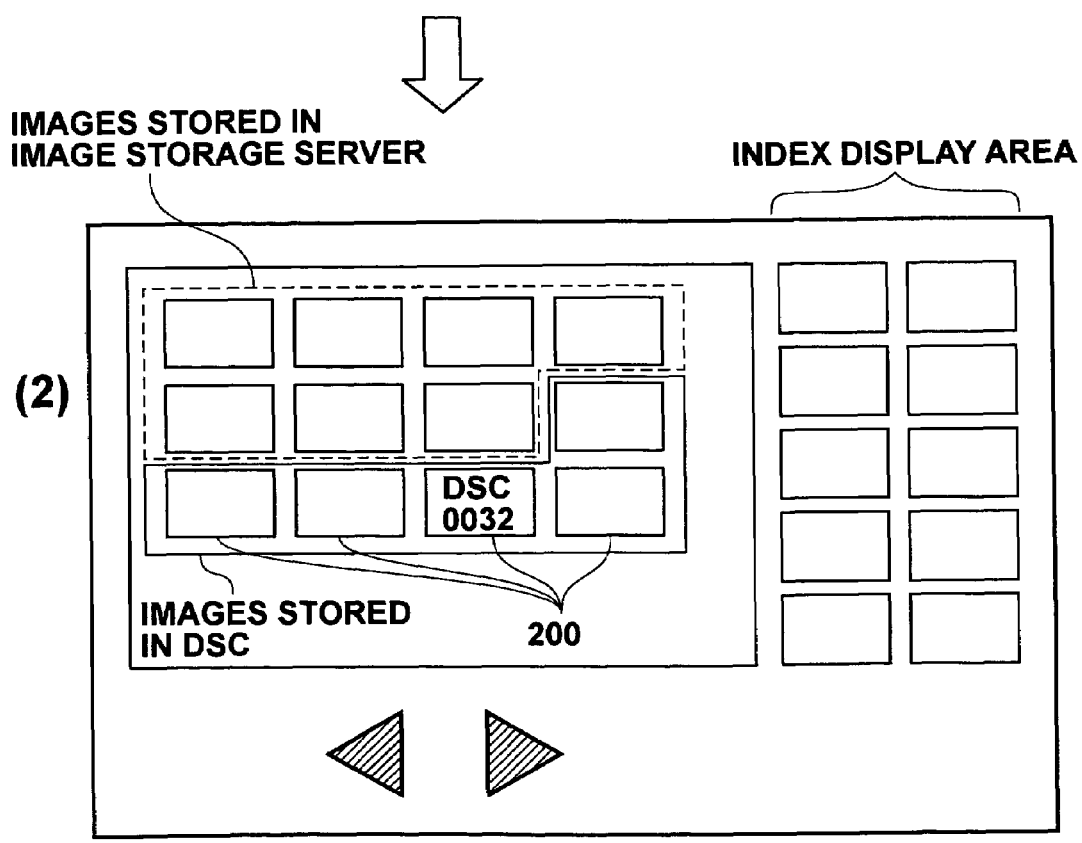

Alternatively, the image reproduction apparatus 1 may further comprise management means 90 for collectively managing the relevant image data sets stored in the image storage devices 11 so that reproduction of the grouped image data sets can be instructed. For example, in the case where the image data sets have been photographed in an interval that is shorter than usual, the image data sets are judged to be relevant from the photography date. Therefore, as shown in FIG. 5(1), the relevant image data sets are stored in the same folder 300. By selecting the folder 300, the relevant image data sets are displayed. Alternatively, the folders 300 may be classified according to the photography date so that the image data sets can be displayed according to the photography date upon selection of any one of the folders 300. In FIG. 5(2), the thumbnail images 200 are displayed at the center of the screen. However, the thumbnail images may be displayed in the index display area.

Furthermore, as shown in FIG. 5(2), the image data sets relevant to the same event or similar to each other may be dividedly stored in the image storage devices 11 such as in the digital still camera and in the image storage server, for example.

The operation of the image reproduction apparatus 1 will be explained next with reference to a flow chart shown in FIG. 6.

The image reproduction apparatus 1 is started and how the image storage devices 11 are connected is checked (Step S100). The image storage server is automatically connected to the image reproduction apparatus 1 (Step S101). The user information sending means 70 sends the user information to the image storage server, and a list of the image data sets corresponding to the user information is received in advance. A list of the image data sets stored in the image storage devices 11 is also obtained (by reading a directory, for example), and a connection table 100 shown in FIG. 2 is generated (Step S102).

The image data sets are read from one of the image storage devices 11 specified by the user (S104), and stored in the buffer 32. The reproduction means 30 displays the image data sets stored in the buffer 32 on the display device 31 (S105). In the case where the image data set obtained most recently is stored in the digital still camera as shown in the connection table 100 in FIG. 2, the image data sets stored in the digital still camera may be reproduced first.

When the user operates the decrement key or the increment key of the reproduction image specification device 81, the reception means 80 receives the control code, and changes the image data set to be displayed, according to the control code that has been received (Step S106).

The reading means 20 reads the image data sets from the image storage device 11 according to the instruction by the user, and the image data sets are stored in the buffer 32 (Step S104). When the boundary detection means 40 detects the boundary (Step S107), the storage device search means 50 finds the image storage device 11 that stores the image data sets to follow the image data sets being displayed, with reference to the connection table 100. The switching means 60 switches from the image storage device to the image storage device 11 that has been found (Step S108), and the image data sets are read therefrom (Step S104). When the user selects completion of image reproduction, the procedure ends (Step S103).

The case has been explained above where the image data sets obtained by the single digital still camera are recorded in the image storage devices 11 such as the DVD and the image storage server. The case where image data sets obtained by a plurality of digital still cameras are stored will be explained next.

More specifically, image data sets obtained by a plurality of digital still cameras may be stored in the DVD and the image storage server. Furthermore, the digital still camera connected to the image reproduction apparatus 1 may be different from a digital still camera that obtained the image data sets stored in the DVD and the image storage server. In the cases like these, file names of the image data sets often have a serial number for each of the digital still cameras.

Therefore, in the case where the image data sets obtained by the digital still cameras are stored in the DVD and the image storage server, directories of the image data sets stored therein may be read so that the serial image data sets can be judged according to the photography date.

In the case where the digital still camera connected to the image reproduction apparatus 1 is different from the digital still camera that obtained the image data sets stored in the DVD and the image storage server, or in the case where the plurality of digital still cameras are connected, the photography date is compared among the image data sets stored in each of the digital still cameras and among the image data sets stored in the DVD and the image storage server. The image data sets are then read from the image storage device 11 that stores the image data set photographed most recently. After the image data sets are read from the image storage device 11, the image data sets stored in another one of the image storage devices 11 are read.

As has been described above, various methods can be used for reproduction of the image data sets obtained by the digital still cameras. However, any method that is most natural is preferably adopted for people to serially reproduce the image data sets. Therefore, the method of judging continuity of the image data sets and timing of switching the image storage devices are determined in consideration of the accompanying information added to the files of the image data sets, the type of the image storage devices 11, and a state of usage of the image storage service such as the photo bank, for example.

A program having the functions of the image reproduction apparatus 1 described above may be recorded in a recording medium such as a CD-ROM and installed in a computer to realize the functions.

Alternatively, the program may be downloaded via a network such as the Internet so that the program can be installed in the image reproduction apparatus 1 that is provided in various forms such as the TV set, the personal computer and a reception terminal.

In this manner, the image data sets stored in the image storage devices can be confirmed in order of photography.

What is claimed is:

1. An image reproduction apparatus comprising: a plurality of image storage devices; an image display device; and an image reproduction device coupled between the image storage devices and the image display device to sequentially reproduce serial image data sets obtained from the image storage devices on the image display device; said image reproduction device comprising: input means connected with said plurality of image storage devices for inputting serial image data sets from the image storage devices; reading means for reading the serial image data sets from one of the image storage devices; boundary detection means for finding a boundary of the serial image data sets read from the image storage device by the reading means; storage device search means for searching the image storage devices for the image storage device that stores serial image data sets to be continued from the boundary of the serial image data sets found by the boundary detection means; switching means for switching the image storage device read by the reading means to the image storage device searched for by the storage device search means when the boundary of the serial image data sets is detected by the boundary detection means; and reproduction means for enabling sequential reproduction of the serial image data sets read by the reading means on said image display device.

2. The image reproduction apparatus according to claim 1, wherein one of the image storage devices is an image storage server for storing the image data sets by being connected to a network, and the reading means is able to read the image data sets stored in the image storage server via the network.

3. The image reproduction apparatus according to claim 2 wherein said image reproduction device further comprises user information sending means for sending user information to the image storage server for identifying a user of the image data sets stored in the image storage server, and the reading means reads only the image data sets corresponding to the user information from the image storage server.

4. The image reproduction apparatus according to claim 3, wherein the reproduction means is able to reproduce the image data sets preceding the boundary and the image data sets following the boundary in one and the same screen of the display device.

5. The image reproduction apparatus according to claim 3, wherein the respective image storage devices record the image data sets by associating the image data sets and record at least one of the associated image data sets as representative image data and wherein the reproduction means is able to reproduce the image data sets that are associated with each other when the representative image data thereof are specified.

6. The image reproduction apparatus according to claim 3 wherein said image reproduction device further comprises management means for collectively managing the image data sets that are associated with each other among the image data sets stored in the image storage devices, and the reproduction means is able to collectively reproduce the image data sets that are associated with each other.

7. The image reproduction apparatus according to claim 3 wherein said image reproduction device further comprises reception means for receiving a control code for specifying the image data sets to be reproduced from a reproduction image specification device, and the reproduction means is able to reproduce the image data sets according to the control code.

8. A computer readable recording medium storing a program that causes a computer to have functions of: connection means for connecting a plurality of image storage devices; reading means for reading serial image data sets from one of the image storage devices; boundary detection means for finding a boundary of the serial image data sets read from the image storage device by the reading means; storage device search means for searching the image storage devices for the image storage device that stores serial image data sets to be continued from the boundary of the serial image data sets found by the boundary detection means; switching means for switching the image storage device read by the reading means to the image storage device searched for by the storage device search means when the boundary of the serial image data sets is detected by the boundary detection means; and reproduction means for enabling sequential reproduction of the serial image data sets read by the reading means on a display device.

* * * * *